Oct. 23, 1962   A. M. FURY ETAL   3,059,611
MONITORING APPARATUS

Filed July 5, 1960   2 Sheets-Sheet 1

INVENTORS
ARTHUR M. FURY
CLARENCE L. SMITH

BY *Edgar H. Kent*
ATTORNEY

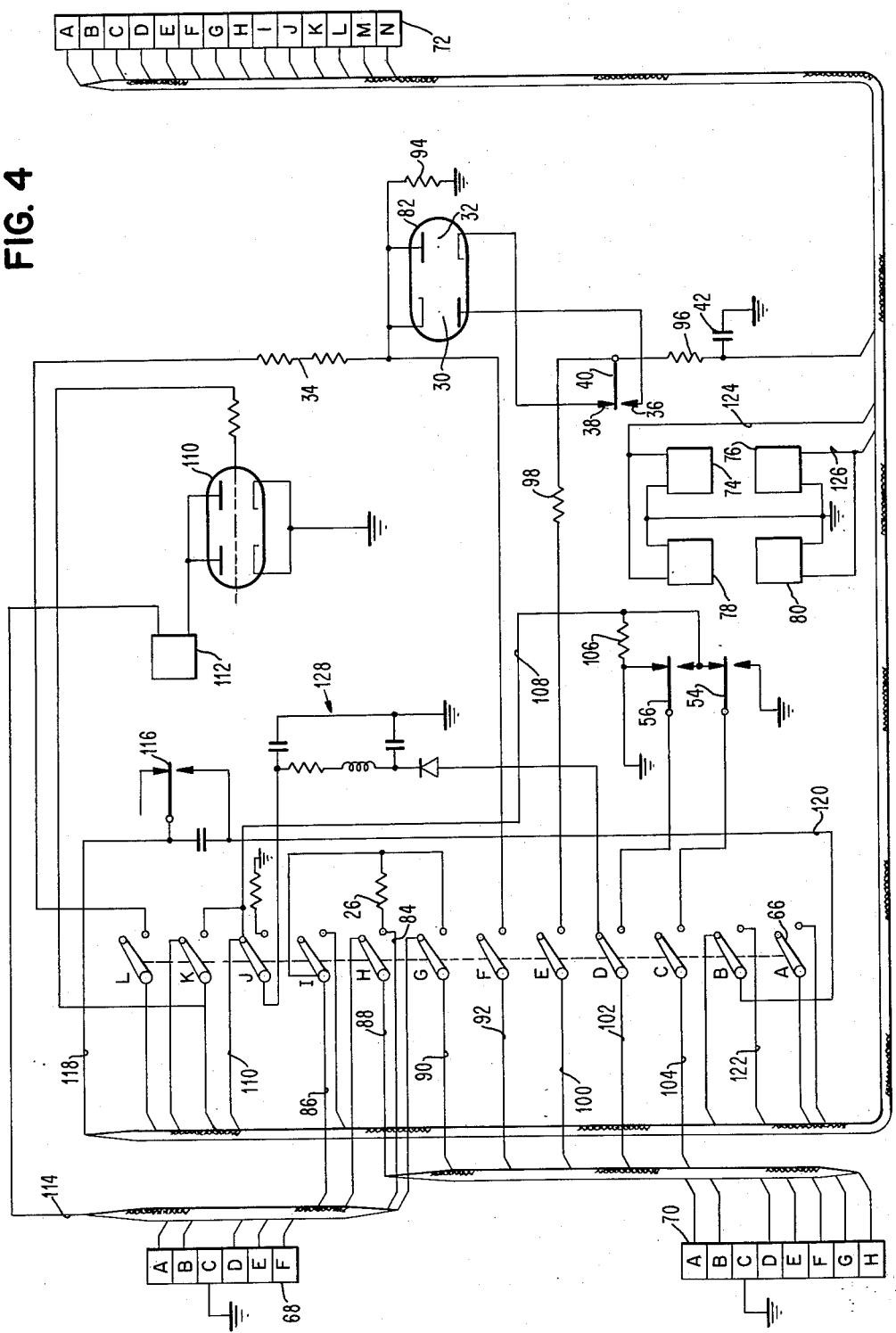

3,059,611
MONITORING APPARATUS
Arthur M. Fury and Clarence L. Smith, Kingston, N.Y., assignors to International Business Machines Corporation, New York, N.Y., a corporation of New York
Filed July 5, 1960, Ser. No. 40,707
11 Claims. (Cl. 118—8)

This invention relates to monitoring apparatus and more particularly to apparatus especially useful in conjunction with the photometric monitoring of a process of coating a substrate with a thin film of semi-transparent material, by evaporation or similar processes, to control the film thickness.

In depositing materials on suitable substrates it is frequently of critical importance to accurately control the thickness of the deposited material. This accurate control is particularly important in the deposition of certain materials such as silicon on substrates to a film thickness of a few thousand Angstroms with an accuracy of a fraction of a percentage point for use in electronic apparatus. Accurate control of the deposition of certain materials can be achieved through the sensing of the resistance characteristic of the film as an indication of the thickness thereof. However, the thickness of many films, including semi-transparent films of materials such as silicon monoxide, for example, is not susceptible to measurement in this manner. Further it is important in the monitoring of a deposition process that information accurately conveying the instantaneous thickness of the film being deposited be immediately and continuously available.

Accordingly, it is an object of this invention to provide a novel and improved apparatus for accurately controlling the deposition of thin film materials.

Another object of this invention is to provide novel and improved apparatus responsive to light transmission through deposited semi-transparent thin film materials and capable of providing continuous indication of the film thickness during deposition operations so that the thickness of the deposited thin film may be accurately controlled.

Another object of the invention is to provide control apparatus suitable for use in monitoring the deposition of semi-transparent material in thin films which is adapted to sense a series of maxima and minima wherein those maxima and minima are not of constant, but rather are of varying, absolute value.

In the preferred embodiment of the invention photometric means are employed to measure the intensity of monochromatic light passing through the semi-transparent material the deposition of which is being monitored and the output signal is utilized to control the deposition process. As the thickness of the coating increases the amount of light transmitted by the coating and substrate decreases exponentially but there are also intensity variations in the transmitted light due to light reinforcement and interference patterns created in the material which produce an alternating series of maxima and minima. The reinforcement and interference patterns are a function of the refractive index and the thickness of the material and involve maxima and minima which occur at multiples of approximately one quarter of the wave length of the impinging monochromatic light, but are also a function of incident light angle and phase lag introduced by the refractive index of the material. By varying the angle of incident light the maxima-minima conditions can be controlled to occur at selected points corresponding to desired deposition thicknesses.

The signal response of the photometric sensing means, after being amplified, is applied to a switching network which senses the change in sign of the slope (the derivative of the signal) of the voltage signal that occurs at the maxima and minima. The signal output of the switching network is sensed by a voltage comparator which is actuated to produce a control signal shortly after each maximum and minimum point. The resulting series of control signals is utilized to control the deposition process. The monitoring circuitry is designed to operate independently of the varying amplitudes of the maxima and minima but rather in response to the change in the sign of the derivative of the signal which takes place when the amount of transmitted light goes through a maximum or a minimum condition.

Other objects and advantages of the invention will be seen as the following description of a preferred embodiment thereof progresses in conjunction with the drawings, in which:

FIG. 4 is a diagram of a portion of the relay circuitry associated with the monitoring apparatus.

Figure 1:
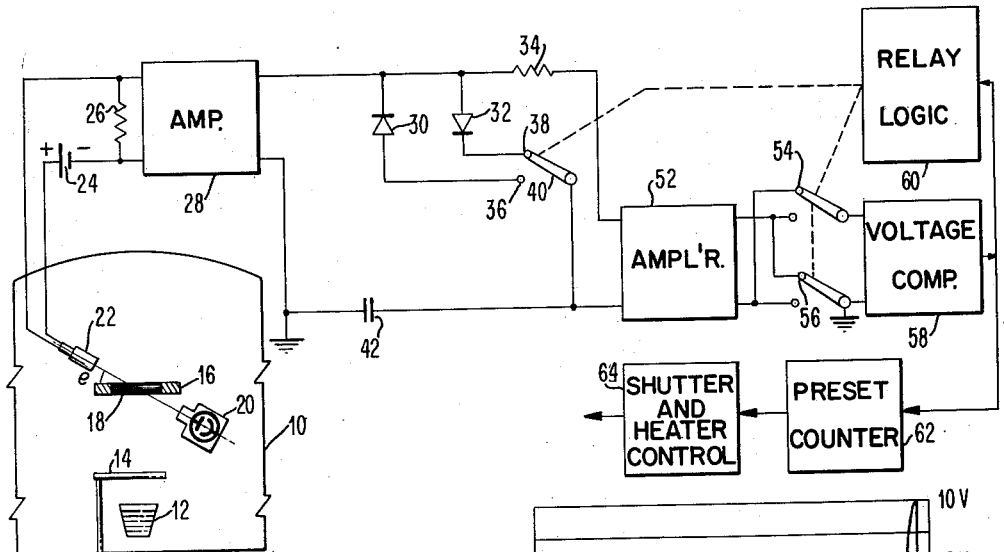
FIG. 1 is a diagrammatic view of the vacuum chamber and associated deposition control apparatus utilized in the preferred embodiment of the invention.

As shown in FIG. 1 there is a vacuum chamber 10 in which is positioned a boat 12 which holds material to be evaporated during the deposition process and shutter mechanism 14 which controls the flow from the boat of material to be deposited on the specimen 18 mounted in the specimen holder 16 and on a suitable monitor slide. A source of monochromatic light 20 is disposed at a preferred angle on one side of the specimen holder and a photo tube 22 is disposed in alignment with the light source 20 on the side of the specimen holder opposite to the source of light.

Figure 2:
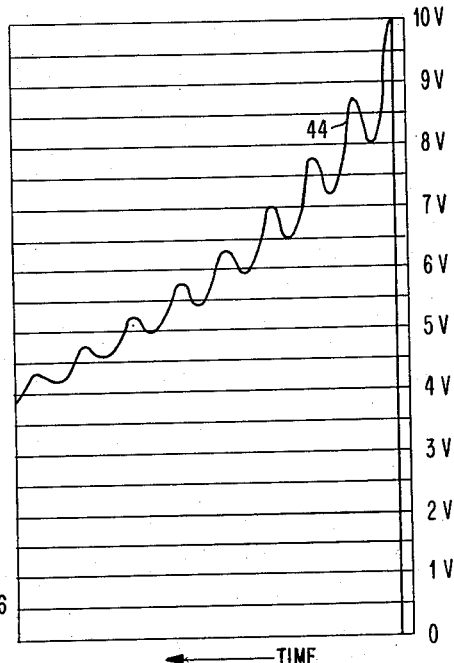
FIG. 2 is a graph of the voltage output of the photometric sensing means during the deposition operation.

The material to be deposited on the specimen is a semi-transparent material such as silicon. The thin layer of this material (in the order of 10,000 A. in final thickness), as it is built up, produces light reinforcement and interference patterns as indicated above. The light transmitted from the monochromatic source 20 through the material as sensed by the photo cell 22 therefore passes through a series of maxima and minima as the average value of the light transmitted gradually decreases exponentially toward zero. The maxima are spaced at approximately one quarter of a wave length intervals as a function of the film thickness. The signal output of the photo tube as a result of this deposition process is shown in FIG. 2 where it will be noted that there are a series of alternating maxima and minima while the curve is following a generally decreasing exponential path. Although the locations of the maxima and minima are subject to slight variation along the exponential path, as the number of maxima (or minima) is a function of the thickness of the film of material deposited on the specimen, the thickness of the film deposited in the substrate may be controlled within a fraction of a percentage point by counting these maxima or minima and by properly adjusting the angle of incidence of the light for transmission through the specimen.

Battery 24 supplies voltage for operation of the photo tube and the sensed light variations are reproduced as voltage variations by the photo tube across the resistance 26. The signal across resistance 26 is amplified by amplifier 28 and applied to the control circuitry which includes diodes 30, 32, resistor 34, relay contacts 36, 38, contact arm 40 and capacitor 42.

Figure 3:
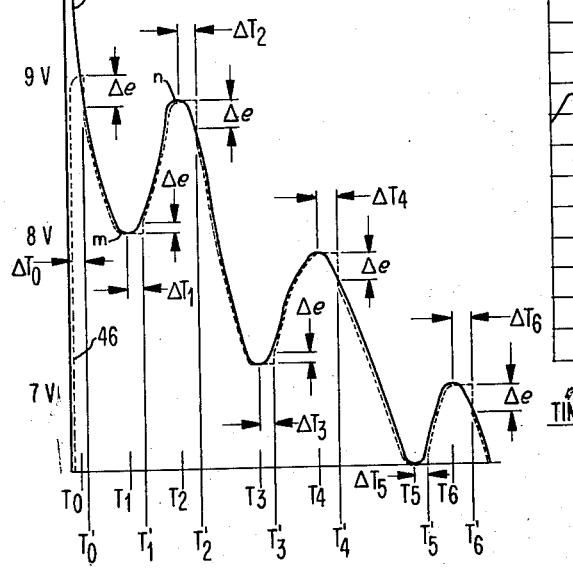
FIG. 3 is an enlarged portion of the graph of FIG. 2.

At the start of the deposition operation the monitor circuitry is switched on and the voltage output of amplifier 28 immediately goes to +10 volts as indicated by line 44 in FIG. 2 and in the enlarged portion of FIG. 2 in FIG. 3. This voltage represents the output of the photo tube with no deposition material on the substrate. The capacitor 42 charges towards +10 volts along the dotted line 46 in FIG. 3 through diode 32. This voltage across diode 32 is amplified by amplifier 52 and applied through relay contacts 54, 56 to voltage comparator circuitry 58. The voltage comparator input circuitry is arranged so that this voltage tends to drive the comparator circuitry into its cut off region since a voltage difference of approximately three volts of predetermined polarity is needed to operate the comparator circuitry. (As the amplifier 52 has a gain of approximately 30 this is equal to 0.1 volt across the connected diode.)

As the voltage 46 on the capacitor 42 continues increasing towards +10 volts the voltage produced by the photo tube indicated by line 44 is decreasing due to material and light interference build up. However capacitor 42 continues to charge until its voltage is equal to the voltage output of amplifier 28. This point of equality occurs at time $T_0$ indicated in FIG. 3. The voltage output of amplifier 28 continues to decrease but capacitor 42 cannot follow as diode 32 becomes back biased (diode 30 is not connected in circuit) but discharges slowly through the series resistance of amplifier 52 (approximately 5 megohms) and resistor 34. The voltage difference between the capacitance voltage 46 and the amplifier output voltage 44 appears as a back bias voltage across diode 32 and is amplified by amplifier 52 so that when this back bias voltage reaches 0.1 volt (after time $\Delta T_0$) the voltage comparator circuitry 58 operates (at time $T'_0$) and provides an output to operate the relay logic circuitry 60 to change the positions of the relay members 40, 54 and 56. This D.C. output signal also is applied to a preset counter 62 as a stepping impulse.

When the relay contacts 54, 56 change position the polarity of the voltage applied to the voltage comparator immediately changes and cuts off the voltage comparator output and the control signal to the counter and relay logic. When the relay member 40 switches from contact 38 to contact 36 a discharge path for capacitor 42 is available through diode 30 and capacitor 42 immediately discharges to the voltage output of amplifier 28.

The capacitor voltage (line 46) continues to follow the output voltage (line 44) of amplifier 28 until time $T_1$ which is a condition of maximum light interference in the material being monitored. Voltage 44 now begins to increase because light interference in the material is decreasing but the capacitor 42 cannot follow that voltage rise as diode 30 is now back biased. This voltage difference between that and the capacitor 42 and the voltage output of amplifier 28 is applied to amplifier 52 for amplification to the voltage comparator circuitry. After interval $\Delta T_1$, when the voltage difference becomes 0.1 volt (time $T'_1$) the voltage comparator circuitry 58 operates to supply a D.C. level to the relay logic and to step the counter. The relay logic operates the relay contacts 40, 54 and 56 to reverse their positions and the operation is repeated. The capacitor 42 charges up and follows the output of amplifier 28 until a period of maximum light transmission is reached and then the voltage output of amplifier 28 starts to decrease. However again the voltage on capacitor 42 cannot follow and after a time interval $\Delta T_2$ (between $T_2$ and $T'_2$) when the voltage difference $(\Delta e)$ has reached 0.1 volt the voltage comparator circuitry operates to switch the relays and to step the counter.

The process continues and the comparator operates immediately after each relative maximum and minimum. When the comparator has operated the counter 62 a predetermined number of times the counter produces an output which operates shutter and heater control circuitry 64 to move the shutter over the boat 12 and to turn off the induction heater which is applying heat to the boat, thus immediately terminating the deposition process.

It is preferable that the comparator circuitry should operate within ±10% which means with less than a variation of 0.01 volt across diodes 30, 32. By suitable control of the light source, the voltage swing between adjacent maxima and minima, such as $m$ and $n$, can be kept above 0.5 volt so that the signal variations across the diodes corresponding to less than ±15 Angstroms for silicon monoxide film can be detected. It is seen that as the thickness of the deposited layers increases, the voltage differences between adjacent maxima and minima get smaller. This difference may fall below a not readily measurable value, so means, not shown, are provided to increase the intensity of light source 20, when such increased intensity of light or increased output signal from the photo cell 22 are desired. With a desired deposition thickness of 10,000 Angstroms, a variation of less than ±0.2% can be achieved through the use of this circuitry.

A more detailed diagram of the monitoring control circuitry is shown in FIG. 4. This circuitry is also used in conjunction with a resistance system for monitoring opaque film depositions and hence portions of the circuitry shown in FIG. 4, such as switch 66, are used for that purpose. For the transparent film monitoring operation the switch 66 is placed in its lower position. Also shown in FIG. 4 are terminal blocks 68, 70 and 72 which provide connections to other portions of the circuitry that are not necessary to show in detail in order to provide a proper understanding of the invention. The relay contact member 40 is controlled by a relay pick up coil 74 and a release coil 76. The relay contacts 54 and 56 are controlled by relay pick up coil 78 and release coil 80. The diodes 30, 32 are combined in the dual diode tube 82 which is type 6AL5 in the preferred embodiment.

The input signal from the cathode of phototube 22 is applied through the contact associated with the switch element 66H from terminal block 68D over line 84. The signal is connected through resistor 26, switch member 66I and lead 86 to terminal block 68E and the 67.5 volt battery 24. From contact switch element 66H it is applied over line 88 to terminal block 70A to the amplifier 28. The other input to the amplifier is through switch 66G and line 90 via terminal block 70B. The output from the amplifier is applied through switch 66F and line 92 to the diodes 30 and 32 and load resistor 94 with a conduction path through the connected diode, resistor 96 and capacitor 42 to ground.

The voltage difference across the connected diode is applied via resistor 98, switch element 66E, line 100 and terminal block 70F to amplifier 52. The outputs of the amplifier 52 are applied over lines 102 and 104 through switch elements 66C and 66D to the relay contacts 54 and 56 for application across resistor 106 to line 108 as an input to the voltage comparator circuitry via switch element 66K to the grids of the voltage comparator tube 110 (type 12AU7). A relay 112 is connected in the plate circuit of the voltage comparator tube via a line 114 and terminal block 68F to a 125 volt D.C. source. Associated with relay 112 is a set of contacts 116, one terminal of which is connected via line 118 and terminal block 72B to a 12 volt D.C. source. When the voltage comparator tube operates, energizing relay coil 112, the contacts 116 are shifted to apply the 12 volt signal over line 120 through switch contacts 66B, line 122, and terminal 72K to operate associated relays of relay logic 60 and to step counter 62. One of the relays operated opens the plate circuit of tube 110, removing of the 125 volt signal from relay 112 and de-energizing that relay so that the comparator output signal is removed from line 120. The operation of the relay logic energizes the pick up coils 74 and 78 over line 124 to switch the positions of relay contacts 40, 54 and 56. As outlined above this operation is repeated the predetermined number of times as indicated by the counter and when the counter is stepped to the requisite value it produces an output signal which operates the shutter 14 and heater mechanism to end the deposition operation. (The filter circuitry 128 shown in FIG. 4 is utilized with the resistance monitoring apparatus as the amplifiers employed with that apparatus have a gain in an order of 2,000 and the deleterious effect of the internally generated noise of the system is eliminated through the use of that filter network.)

Thus the invention provides a system for monitoring the deposition of thin films of semi-transparent materials by utilizing the light transmitted through the film of deposited material and evaluating that light transmission with the photometric means and control circuitry so that the thickness of the film of material can be accurately controlled. While a preferred embodiment of the invention has been shown and described it will be understood by those skilled in the art that various departures may be made therefrom and therefore it is not intended that the scope of the invention be limited to the disclosed apparatus or to details thereof and departures may be made therefrom within the spirit and scope of the invention as defined in the claims.

We claim:

1. Apparatus for depositing semi-transparent material in a thin film on a transparent substrate comprising container means for holding the material to be deposited on said substrate, means for controlling the transfer of material from said container for deposit on said substrate and means for sensing the thickness of the thin film deposited on said substrate comprising a source of monochromatic light disposed on one side of said substrate, light sensing means optically aligned with said source and disposed on the opposite side of said substrate to sense light passing through said subtrate from said source and to produce a voltage proportional to that light, a capacitor, a pair of asymmetrically conductive means poled in opposite directions to provide alternate charging paths for said capacitor across the output of said sensing means, first relay means for alternately connecting said asymmetrically conductive means in circuit with said capacitor, comparator means to sense a voltage difference of a particular polarity between the voltage and said capacitor and the voltage output of said light sensing means, second relay means arranged to switch the polarity of the voltage difference to which said comparator means is responsive and means to operate said first and second relay means upon the sensing by said comparator of a voltage difference of a predetermined magnitude and of the particular polarity specified by said second relay means and to provide signals for controlling said transfer controlling means.

2. Apparatus for depositing semi-transparent material in a thin film on a transparent substrate comprising container means for holding the material to be deposited on said substrate, means for controlling the transfer of material from said container to said substrate and means for sensing the thickness of the thin film deposited on said substrate comprising a source of monochromatic light disposed on one side of said substrate, light sensing means optically aligned with said source and disposed on the opposite side of said substrate to sense light passing through said substrate from said source and to produce a voltage proportional to that light, a capacitor, a pair of asymmetrically conductive devices poled in opposite directions and arranged in circuit to provide charging paths for said capacitor across the output of said sensing means, first relay means for alternately connecting said asymmetrically conductive devices in circuit with said capacitor, comparator means to sense a voltage difference of a particular polarity between the voltage on said capacitor and the voltage output of said light sensing means, second relay means arranged to control the polarity of the voltage difference to which said comparator means is responsive, said comparator being arranged to provide an output signal upon the sensing by said comparator of a voltage difference of a predetermined magnitude and of the particular polarity specified by said second relay means, and a counter adapted to be stepped by said output signal and arranged to control said material transfer controlling means.

3. Apparatus for depositing films of silicon and similar material on a transparent substrate to an accurate thickness in the order of a few thousand Angstrom units comprising a vacuum chamber, means to support said transparent substrate within said vacuum chamber, a source of the material to be deposited on said substrate positioned within said chamber, apparatus for controlling movement of material from said source of material, a source of radiant energy positioned on one side of said substrate, a device for sensing said radiant energy positioned on the opposite side of said substrate from said source, said device providing a pulsating signal proportional to the transmission of energy through said substrate, means to sense the maxima and minima in said pulsating signal, and means responsive to said sensing means to operate said material controlling apparatus for controlling the deposition of said material on said substrate.

4. The apparatus as claimed in claim 3 wherein said signal is in the form of a voltage and said sensing means includes a capacitor, a pair of asymmetrically conductive devices, said asymmetrically conductive devices being connected to provide alternate circuit paths and being connected in said circuit paths in opposite sense to one another, means to alternately connect said asymmetrically conductive devices in series with said capacitor across the output of said sensing means so that said voltage charges said capacitor until a maximum or a minimum of said pulsating signal causes the sign of the derivative of said signal to change, and means to sense a difference between the voltage on said capacitor and the signal voltage.

5. The apparatus as claimed in claim 4 wherein said means responsive to said sensing means includes an electronic element adapted to provide a control signal in response to the detection of a difference of a predetermined magnitude between the voltage on said capacitor and said output signal voltage, and a counter adapted to provide a signal to said material controlling apparatus when it contains a predetermined count, said control signal being adapted to step said counter and to operate said asymmetrically conductive device connection means.

6. The apparatus as claimed in claim 5 wherein said asymmetrically conductive device connection means includes first relay means and further including second relay means adapted to reverse the sense of the voltage as applied to said means responsive to said sensing means, each said control signal being adapted to reverse the conditions of said first and second relay means.

7. Apparatus for depositing films of silicon and similar material on a transparent substrate to an accurate thickness in the order of a few thousand Angstrom units comprising a vacuum chamber, means to support said transparent substrate within said vacuum chamber, a boat adapted to hold material to be deposited on said substrate positioned below said substrate, a shutter and associated apparatus for controlling movement of material from said boat in the deposition process, a source of monochromatic light positioned on one side of said substrate, a light sensing device positioned in optical alignment with said source on the opposite side of said substrate, said device providing a pulsating output signal proportional to the transmission of light through said substrate, means to sense the maxima and minima in said pulsating output signal, and means responsive to said sensing means adapted to operate said shutter and associated apparatus for controlling the movement of material from said boat.

8. The apparatus as claimed in claim 7 wherein said signal is in the form of a voltage and said sensing means includes a capacitor and a pair of diodes, said diodes being connected to provide alternate circuit paths and being oppositely poled in said circuit paths, first relay means adapted to alternately connect a diode in series with said capacitor across the output of said sensing means so that said voltage charges said capacitor unitl the occurrence of a maximum or a minimum in said output signal causes the sign of the derivative of said signal to change, second relay means adapted to reverse the sense of the voltage as applied to said means responsive to said sensing means and an electronic element adapted upon detection of a difference of predetermined magnitude between the voltage on said capacitor and the output signal voltage to provide a control signal to reverse the states of said first and second relay means.

9. The apparatus as claimed in claim 8 and further including a counter, said control signal being adapted to step said counter, and said counter being adapted to provide a signal to said shutter and associated apparatus when it has been stepped a predetermined number of times.

10. Control apparatus responsive to a signal consisting of a series of alternating maximum and minimum values comprising a capacitance, a pair of asymmetrically conductive devices poled in opposite directions and arranged in circuit to provide alternate charging paths for said capacitance, means for alternately connecting said asymmetrically conductive devices in circuit with said capacitance, means to apply said signal through the connected one of said devices to charge said capacitance, said device connection means being arranged to select said devices for connection to said capacitance so that the device connected to said capacitance becomes back biased immediately after said signal has passed through the next maximum or minimum and isolates said capacitance from said signal, comparator means for sensing a voltage difference between the charge on said capacitance and said signal, said comparator means providing an output signal upon the sensing of a voltage difference of a predetermined magnitude, said predetermined magnitude of voltage difference indicating that said signal has passed through a maximum or a minimum, means to operate said means in response to each said output signal of said comparator means, and a counter stepped by each output signal of said comparator means for recording the number of sensed maxima and minima in said signal.

11. Control apparatus responsive to a signal consisting of a series of alternating maximum and minimum values comprising a capacitance, a pair of asymmetrically conductive devices poled in opposite directions and arranged in circuit to provide alternate charging paths for said capacitance, first relay means for alternately connecting said asymmetrically conductive devices in circuit with said capacitance, means to apply said signal through the connected one of said devices to charge said capacitance, said first relay means being arranged to select said devices for connection to said capacitance so that the device connected to said capacitance becomes back biased immediately after said signal has passed through the next maximum or minimum and isolates said capacitance from said signal, comparator means for sensing a voltage difference of a particular polarity between the charge on said capacitance and said signal, said comparator means providing an output signal upon the sensing of a voltage difference of a predetermined magnitude and of said particular polarity, said predetermined magnitude of voltage difference indicating that said signal has passed through a maximum or a minimum, second relay means to control the polarity of the voltage difference to which said comparator means is responsive, means to operate said first and second relay means in response to each said output signal of said comparator means, and a counter stepped by each output signal of said comparator means for recording the number of sensed maxima and minima in said signal.

References Cited in the file of this patent

UNITED STATES PATENTS

| | | |
|---|---|---|
| 2,239,452 | Williams et al. | Apr. 22, 1941 |
| 2,674,973 | Thorington | Apr. 13, 1954 |
| 2,833,922 | Gerks | May 6, 1958 |
| 2,840,707 | Johnson | June 24, 1958 |
| 2,877,418 | Eldridge et al. | Mar. 10, 1959 |
| 2,939,083 | Hague et al. | Mar. 31, 1960 |

OTHER REFERENCES

Journal of the Optical, vol. 46, No. 12, December, 1956.